(12) United States Patent
Wiechers (10) Patent No.: US 11,256,222 B2
(45) Date of Patent: Feb. 22, 2022

(54) ASSISTANCE FOR THE CAUSING OF ACTIONS

(71) Applicant: Ralph Wiechers, Mayschoß (DE)

(72) Inventor: Ralph Wiechers, Mayschoß (DE)

(73) Assignee: Deutsche Post AG, Bonn (DE)

( * ) Notice: Subject to any disclaimer, the term of this patent is extended or adjusted under 35 U.S.C. 154(b) by 1220 days.

(21) Appl. No.: 15/205,884

(22) Filed: Jul. 8, 2016

(65) Prior Publication Data

US 2017/0010592 A1 Jan. 12, 2017

(30) Foreign Application Priority Data

Jul. 10, 2015 (DE) ...................... 10 2015 111 217.5

(51) Int. Cl.
*G06F 21/00* (2013.01)
*G05B 15/02* (2006.01)
(Continued)

(52) U.S. Cl.
CPC .............. *G05B 15/02* (2013.01); *E05B 47/00* (2013.01); *E05B 65/006* (2013.01);
(Continued)

(58) Field of Classification Search
CPC ......... G05B 15/02; G05B 1/01; H04L 9/3247; H04L 9/3234; H04L 9/3215; H04L 12/2816; H04L 2012/2841; H04L 63/08; H04L 63/10; H04L 2209/80; E05B 47/00; E05B 65/0007; E05B 65/006; E05B 2047/0048; E05B 2047/0067; E05B 2047/0072; E05B 2209/61;
(Continued)

(56) References Cited

U.S. PATENT DOCUMENTS

| | | | |
|---|---|---|---|
| 7,183,894 B2 * | 2/2007 | Yui | G07C 1/10 340/5.22 |
| 7,801,977 B2 * | 9/2010 | Motoyama | H04L 43/067 709/223 |

(Continued)

FOREIGN PATENT DOCUMENTS

| | | |
|---|---|---|
| CN | 1592811 A | 3/2005 |
| CN | 102622788 A | 8/2012 |

(Continued)

*Primary Examiner* — Maung T Lwin
(74) *Attorney, Agent, or Firm* — Reinhart Boerner Van Deuren P.C.

(57) ABSTRACT

A server obtains a message that an authorization for requesting an action via a first apparatus is allocated, wherein the action can be caused by a separate control unit. The server compiles information that identifies the action and that allows the first apparatus to check the authorization. The compiled information is transmitted to a second apparatus. The first apparatus can obtain a message from the second apparatus, which is used to request the causing of the action. The first apparatus checks the authorization for the request on the basis of the obtained message and whether the action is an action that is to be caused by the first apparatus or by the control unit. If it is established that authorization exists and that the action is to be caused by the control unit, then the first apparatus transmits a request to the control unit to cause the action.

31 Claims, 5 Drawing Sheets

(51) Int. Cl.
*G07C 9/00* (2020.01)
*E05B 47/00* (2006.01)
*E05B 65/00* (2006.01)
*H04L 9/32* (2006.01)
*H04L 12/28* (2006.01)
*A47G 29/14* (2006.01)

(52) U.S. Cl.
CPC ...... *E05B 65/0007* (2013.01); *G07C 9/00857* (2013.01); *G07C 9/00896* (2013.01); *H04L 9/3247* (2013.01); *H04L 12/2816* (2013.01); *A47G 29/141* (2013.01); *A47G 2029/149* (2013.01); *E05B 2047/0048* (2013.01); *E05B 2047/0067* (2013.01); *E05B 2047/0072* (2013.01); *G07C 2209/08* (2013.01); *H04L 2012/2841* (2013.01)

(58) Field of Classification Search
CPC ............ G07C 9/00103; G07C 9/00309; G07C 9/00571; G07C 9/00007; G07C 9/00111; G07C 2009/00388; G07C 2009/00412; G07C 2009/00825; G07C 2009/00865; G07C 2009/0088; H04W 12/08; G08C 17/02; Y10T 70/735; Y10T 70/625; Y10T 70/70
USPC ................ 713/201, 183; 340/5.61; 455/3.01
See application file for complete search history.

(56) References Cited

U.S. PATENT DOCUMENTS

| | | | | |
|---|---|---|---|---|
| 8,305,032 B2* | 11/2012 | McKenna | ............ | G07F 15/005 320/104 |
| 9,301,203 B2* | 3/2016 | Sayeedi | ................ | H04W 28/12 |
| 9,349,112 B2* | 5/2016 | Gazdzinski | ............ | G06Q 10/08 |
| 9,763,086 B2* | 9/2017 | Benoit | .................. | H04W 12/04 |
| 2004/0162996 A1* | 8/2004 | Wallace | ................ | H04L 63/104 726/1 |
| 2005/0204167 A1* | 9/2005 | Conlin | ............... | G07C 9/00007 726/5 |
| 2009/0119232 A1* | 5/2009 | Mercier | ............... | G07F 17/0014 705/407 |
| 2011/0130134 A1* | 6/2011 | Van Rysselberghe | | A47G 29/141 455/422.1 |
| 2013/0285793 A1* | 10/2013 | Sadighi | ............... | G07C 9/00103 340/5.61 |
| 2013/0338822 A1* | 12/2013 | Gibson, Jr. | ........ | G06Q 10/0836 700/237 |
| 2015/0067792 A1 | 3/2015 | Benoit et al. | | |
| 2015/0215779 A1* | 7/2015 | Fokkelman | ............ | H04W 12/08 726/7 |
| 2015/0371187 A1* | 12/2015 | Irwin | ...................... | G07F 9/002 705/72 |
| 2017/0010592 A1* | 1/2017 | Wiechers | ............ | G07C 9/00857 |

FOREIGN PATENT DOCUMENTS

| | | | | |
|---|---|---|---|---|
| CN | 103280008 A | 9/2013 | | |
| CN | 103593897 A | 2/2014 | | |
| CN | 103646436 A | 3/2014 | | |
| CN | 103647851 A | 3/2014 | | |
| CN | 103957108 A | 7/2014 | | |
| CN | 103999497 A | 8/2014 | | |
| DE | 10 2011 089 496 A1 | 6/2013 | | |
| DE | 102015111217 | * 10/2015 | ......... | G07C 9/00103 |
| EP | 2016566 A1 | * 1/2009 | ......... | G07C 9/00103 |
| GB | 2517527 A | 2/2015 | | |
| WO | WO 03/065854 A1 | 8/2003 | | |
| WO | WO 2015/082603 A1 | 6/2015 | | |

* cited by examiner

ASSISTANCE FOR THE CAUSING OF ACTIONS

CROSS-REFERENCE TO RELATED PATENT APPLICATIONS

This patent application claims priority to German Application No. 10 2015 111 217.5, filed Jul. 10, 2015, the entire teachings and disclosure of which are incorporated herein by reference thereto.

FIELD

Exemplary embodiments of the invention relate to methods that allow selected actions to be requested and to corresponding apparatuses, computer programs and systems comprising these apparatuses. Exemplary embodiments of the invention relate particularly to the enabling of actions by an access control apparatus.

BACKGROUND

Access control apparatuses are used in many respects, for example to control access by persons to rooms in a building, as is the case with hotels, office complexes or laboratories, for example, to events or, in an abstract form, to functions, resources or services, for example from computer functions or resources or server services.

One specific application for access control apparatuses is also the control of access by persons to openings of containers, such as e.g. safety deposit boxes or goods delivery containers, particularly of parcel boxes. Parcel boxes allow a novel form of delivery/pickup of parcels for persons who wish to receive or send parcels at or in proximity to their residence even in their absence. To this end, parcel boxes are usually installed in front of the residence of the parcel box user—in a similar manner to a mailbox, but with a greater receiving volume—and parcels are then delivered by the delivery agent by placing them into the parcel box or are picked up by removing them from the parcel box. In order to prevent misuse and theft, the parcel box needs to have a lock. Both the delivery agent and the parcel box user then need to be equipped with physical or electronic keys in order to be able to use the parcel box. To this end, digital keys, for example, may be stored as data records on what are known as tokens, for example on mobile telephones or RFID tags, which can therefore act as electronic keys.

SUMMARY OF SOME EXEMPLARY EMBODIMENTS OF THE INVENTION

The invention is based on the object of extending the usability of actions that can be caused by a control unit and/or of extending the applicability of an apparatus that is configured to check authorizations of requests from other apparatuses.

According to a first aspect of the invention, a method, performed by a first apparatus, is disclosed that comprises the following:
- obtaining a message from a second apparatus, which is used to request the causing of an action,
- checking the authorization for the request on the basis of the obtained message,
- checking whether the action is an action that is to be performed or caused by the first apparatus or an action that is to be caused by a control unit that is separate from the first apparatus, and
- if it is established that authorization exists and that the action is to be caused by the control unit, transmitting a request to the control unit to cause the action.

According to the first aspect of the invention, an apparatus is further disclosed that comprises means for performing and/or controlling an arbitrary embodiment of the method according to the first aspect. In this case, it is either possible for all the steps of the method to be controlled by the means, or for all the steps of the method to be performed by the means, or for one or more steps to be controlled by the means and one or more steps to be performed by the means. Different steps can optionally be performed or controlled by different means. The apparatus corresponds to the first apparatus in the method or to a component of said first apparatus. The means can comprise hardware and/or software components. By way of example, the means can comprise at least one memory having program instructions of a computer program and at least one processor configured to execute program instructions from the at least one memory.

According to the first aspect of the invention, a system is further disclosed that, besides an arbitrary embodiment of the apparatus according to the first aspect, comprises the second apparatus and/or the control unit.

According to a first aspect of the invention, a computer program is further disclosed that comprises program instructions that are configured, when executed by at least one processor, to cause an apparatus to perform an arbitrary exemplary embodiment of the method according to the first aspect.

According to a second aspect of the invention, a method, performed by a server, is disclosed that comprises the following:
- obtaining a message that an authorization for requesting an action via a first apparatus is allocated, wherein the action can be caused by a control unit that is separate from the first apparatus,
- compiling information that identifies the action and that allows the first apparatus to check the authorization, the information being based on the obtained message, and
- causing transmission of the compiled information to a second apparatus in order to authorize the second apparatus to request causing of the action by the control unit via the first apparatus.

According to the second aspect of the invention, an apparatus is further disclosed that comprises means for performing and/or controlling an arbitrary embodiment of the method according to the second aspect. In this case, it is again possible either for all the steps of the method to be controlled by the means, or for all the steps of the method to be performed by the means, or for one or more steps to be controlled by the means and one or more steps to be performed by the means. Different steps can optionally be performed or controlled by different means. The apparatus corresponds to the server from the method according to the second aspect or to a component of this server. The means can comprise hardware and/or software components. By way of example, the means can comprise at least one memory having program instructions of a computer program and at least one processor configured to execute program instructions from the at least one memory.

According to the second aspect of the invention, a system is further disclosed that, besides an arbitrary embodiment of the apparatus according to the second aspect, comprises the control unit and/or the first apparatus and/or the second apparatus.

According to the second aspect of the invention, a computer program is further disclosed that comprises program instructions that are configured, when executed by at least one processor, to cause a server to perform an arbitrary exemplary embodiment of the method according to the second aspect.

Processors can be understood in each case to mean, inter alia, control units, microprocessors, microcontrol units, such as microcontrollers, digital signal processors (DSPs), application-specific integrated circuits (ASICs) or field programmable gate arrays (FPGAs). By way of example, each of the computer programs may be distributable via a network such as the Internet, a telephone or mobile radio network and/or a local area network. Each of the computer programs may at least in part be software and/or firmware of a processor. By way of example, each of the computer programs may be stored on a respective computer-readable storage medium, e.g. a magnetic, electrical, electromagnetic, optical and/or other kind of storage medium. By way of example, the storage medium may be part of a processor, for example a (nonvolatile or volatile) program memory of the processor or a part thereof; it may alternatively be a component that is separate from the processor.

Particular embodiments of the invention thus provide for a first apparatus to be used not only in order to check the authorization for requesting actions that can be caused by the first apparatus itself. Rather, such a first apparatus is rendered able to check the authorization also for requested actions that can be caused by a different, physically separate control unit. In this case, by way of example, the information required for checking the authorization can be compiled by a server, for example at the request of a user who is authorized to have the control unit.

The message obtained, according to the first aspect, on the first apparatus can contain encrypted data as check information, for example. The checking of the authorization for the request can comprise decryption of the encrypted data and comparison of the decrypted data with unencrypted data. In this case, the unencrypted data may likewise be contained in the obtained message, derived from contained data and/or stored in the first apparatus. By way of example, the encrypted data can be provided by the server according to the second aspect. The server can use a first key for the encryption, for example, and the first apparatus can use a second key from a key pair for the decryption.

The message obtained, according to the first aspect, on the first apparatus may alternatively or additionally contain data and a digital signature for the data as check information, for example. The checking of the authorization for the request can comprise checking of the digital signature. The signature and the signed data can be provided by the server according to the second aspect, for example. The server can use a first key for the signature, for example, and the first apparatus can use a second key from a key pair for checking the signature.

Both when encryption is used and when a digital signature is used, the key pair may be an asymmetric key pair. For encryption of data, the first key may be a public key and the second key may be a private key from an asymmetric key pair, for example; for a digital signature, the association of the keys may be the reverse. In both cases, the first key can be available exclusively to the server and the second key can, in both cases, be available exclusively to the first apparatus. An asymmetric key pair may have been generated according to the RSA algorithm, for example. Alternatively, the key pair may be a symmetric key pair. The symmetric key pair then comprises the same key twice, for example an AES key. The key can be available exclusively to the server and to the first apparatus. Both an asymmetric key pair and a symmetric key pair can be used to directly encrypt or sign the data that are encrypted or signed. Instead, a hash value could also first of all be formed using the data or some of the data, and the hash value could then be encrypted or signed using the first key in order to obtain a piece of check information. For the check, the first device can then first of all use the same algorithm to form a hash value using the data to hand. In the case of encryption, if the original data or the hash values match, then it can be assumed that the obtained data are integral (intact) and that they have been provided by an authorized, trustworthy server. In the case of a signature, if the validity of the signature is confirmed, then it can be assumed that the obtained data are integral and that they have been provided by the trustworthy server.

An action that, according to the first aspect, is to be caused or, according to the second aspect, can be caused by the control unit may comprise enabling access to a secured area. In this case, it is possible, by way of example, for the secured area not to be a parcel box receiving area, a letterbox receiving area or a parcel butler receiving area. By way of example, the action can comprise opening or releasing a door or a gate. In this case, by way of example, it is possible for such a door not to be a parcel box door or a letterbox door. It is accordingly also possible for the release of a secured area not to be release of a parcel butler lid. Access to a parcel box, letterbox and/or parcel butler could instead be controlled by the first apparatus.

For both aspects, the first apparatus may be, by way of example, an access control apparatus or a part thereof, or else an apparatus that comprises such an access control apparatus. An access control apparatus is used to perform access control, for example access to rooms/spaces in buildings (e.g. hotels, office complexes, laboratories) or apparatuses, to events (e.g. concerts, sports events), to functions (for example of a computer, e.g. by means of a login), to resources or to services (for example to a service provided by a server, e.g. online banking, social networks, email accounts) is controlled. Examples of access to spaces in apparatuses are access to receiving spaces in receiving apparatuses, such as e.g. safety deposit boxes, lockers, refrigerators, goods delivery containers, letterboxes, parcel boxes or combined letter and parcel boxes, each of which are closed by doors and secured by locking devices, for example.

For both aspects, the first apparatus may be fitted at a fixed location, for example. For both aspects, it can control access to a receiving unit, for example, and/or may be fitted in or on a parcel box and/or be a locking system of a parcel box and/or be fitted in or on a parcel butler and/or be a locking system of a parcel butler. It could also be a module for such a locking system or else any receiving unit with a locking system, such as a parcel box, a letterbox, a parcel butler or another container. If the first apparatus controls access to a receiving unit, then, for some embodiments, provision may nevertheless be made for the first apparatus to be able to be arranged separately from the receiving unit.

If the first apparatus comprises at least one processor, then the at least one processor can control, by way of example, at least one locking device, for example an electronically actuatable lock, and hence cause opening and/or closing of the lock, for example. The lock may be equipped with a catch function, for example, so that the first apparatus need only control opening of the lock (for example by at least intermittently transferring the catch to an open position, for example by means of an electric motor), for example, while the lock is closed manually by a user by virtue of the latter using the catch function and, for example by pushing a door to, driving the catch from the closed position to the open position and, after pushing-to has ended, the catch automatically returning to the closed position again, for example by virtue of spring loading.

The first apparatus can optionally also comprise such a locking device and/or further components.

For both aspects, the first apparatus may comprise at least one locking device, at least one processor, at least one memory and at least two different communication interfaces, for example. A first communication interface could be a Bluetooth, near field communication (NFC) or radio frequency identification (RFID) interface, for example, and a second communication interface could be an interface for access to a local area radio network (wireless local area network WLAN) or a wired local area network (LAN), for example.

For both aspects, the first apparatus can use a first communication protocol for receiving the message from the second apparatus, for example, and a second, different communication protocol for transmitting the request to the control unit, and/or can use a radio-based communication protocol for receiving the message from the second apparatus and/or can use a radio-based or wired communication protocol for transmitting the request to the control unit.

A radio-based communication protocol used by the first apparatus for receiving messages from a second apparatus may be configured for communication with apparatuses in the closer surroundings of the first apparatus (for example less than 10 m, 50 m or 100 m), for example. By way of example, such wireless communication of the first apparatus may be limited to communication by means of RFID and/or NFC and/or Bluetooth (e.g. Bluetooth version 2.1 and/or 4.0). RFID and NFC are specified on the basis of ISO standards 18000, 11784/11785 and ISO/IEC standard 14443-A and 15693, for example. The Bluetooth specifications are available at www[dot]Bluetooth[dot]org. Communication by the first apparatus with the control unit can take place via a WLAN or an LAN, for example.

For both aspects, the first apparatus may be configured, by way of example, such that it does not have a connection to a mobile radio network. The first apparatus can instead optionally have a universal serial bus (USB) interface, for example, via which the first apparatus can be serviced, for example.

For both aspects, the first apparatus may be battery operated, for example, and have no or no constant electrical connection, for example.

For both aspects, the second apparatus may be a portable electronic device, for example.

Such a device may be a portable electronic device of a delivery agent, for example, particularly if the first apparatus is a parcel box or is associated with a parcel box as an access control apparatus. Such a device is subsequently also referred to as "delivery agent device". By way of example, the delivery agent device then has a graphical user interface and a functionality for wirelessly capturing information from parcels, for example by means of optical scanning of parcel tags and/or capture of information from parcels by radio (e.g. RFID) or magnetic fields (e.g. NFC), for example if the parcel has an RFID tag or NFC tag. By way of example, the delivery agent device may have the ability to communicate via a cellular mobile radio network, but this may also not be the case. By way of example, the delivery agent device may have the ability to communicate via WLAN and/or via a cellular mobile radio system (particularly via GPRS). By way of example, the delivery agent device may have the ability to communicate via Bluetooth and/or NFC, for example including by means of appropriate retrofitting. An example of such a delivery agent device is a hand-held scanner. A delivery agent may generally be a delivery agent for any shipments, e.g. for parcels and/or letters.

Alternatively, a portable electronic device may be associated with a user (e.g. a user in respect of the first apparatus or an apparatus associated therewith), for example. Such a device is subsequently referred to as "user device". If the first apparatus is an access control apparatus, then the user device can be used, by way of example, to communicate access authorization information to the first apparatus, in order to gain access to the first apparatus or to an apparatus associated with the first apparatus. By way of example, the user device has a graphical user interface and/or a dedicated power supply. By way of example, the user device is a mobile telephone, a personal digital assistant (PDA), a media player (e.g. an iPod) or a navigation device. If the first apparatus is in the form of an access control apparatus of a parcel box, then the user device may belong to a parcel box user, for example, that is to say to an owner of the parcel box, for example, or to a person who is permitted to use the parcel box to receive parcels or to place them for pickup by a delivery agent. In this context, a delivery agent is not understood to be a user. By way of example, the user device is configured for wireless communication with the first apparatus, for example via Bluetooth and/or RFID and/or NFC. By way of example, the user device has the ability to use a cellular mobile radio network (e.g. a mobile radio network based on the Global System for Mobile Communication (GSM), the Universal Mobile Telecommunications System (UMTS) and/or the Long Term Evolution (LTE) system) for communication.

Communication between the first apparatus and the second apparatus can be initiated in different ways. By way of example, provision is thus made for the second apparatus to transmit a contact request to the first apparatus, which can then accept said request. By way of example, the transmission of such a contact request can take place in response to a user action or another trigger. Alternatively, the first apparatus could transmit a signal constantly, for example. If Bluetooth is used, such a signal could be an ever alike Bluetooth or Bluetooth Low Energy signal, for example. The second apparatus receives the signal as soon as it comes into reception proximity, and can then react to reception of this signal.

For both aspects, the control unit may be fitted at a fixed location, for example. It may be a server for a building automation system or—more generally—a home automation system, for example, or a component of such a server. A server for a building automation system can control different actuators in a building and a server for a home automation system can control different actuators in a building or in a residential unit of a building. Such actuators may comprise locking devices for arbitrary demarcated areas that can release a door or a gate for opening by a user or that can open a door or a gate by motor operation. Such actuators may further comprise thermostats, light switches and various other devices. The control unit may further be a server for a central locking system for a building or an installation, for example, or a component of such a server. A central locking system allows access to different areas by actuating different locking devices, it being possible for there to be different authorizations for different areas. Thus, in an office building, opening of a building door and of a garage door could be requested by all users by means of an appropriately configured user device, but opening of gates to different office units could be requested only by users who are associated with these offices.

By way of example, the authorization for requesting an action can relate not only to the action itself that can be requested but also to the scope of the authorization for such a request.

For both aspects, the time for the authorization for requesting an action may be limited. An appropriate period may be firmly predetermined or freely selectable. It may also be freely selectable with a maximum permissible value for the length of the period and/or for the end of the period. By way of example, the time limitation can be predetermined for the beginning and the end to the precise day, the precise hour, the precise minute or the precise second. The possible period may also be dependent on the type of the second apparatus. It is thus possible for a period for a delivery agent device to be set to no more than one day, for example, and for the period for a user device to be set to no more than one year, for example. By way of example, the period can also be defined just by an end for the authorization, so that the earliest beginning of the period is provided by the time at which the authorization is granted. The period can also be based on a predetermined (optionally apparatus-dependent) standard value that can be changed by the message that an authorization for requesting an action via a first apparatus is allocated. For some instances of application, it may also be possible to define a period of time, in which an action can be requested, that is repeated daily or on certain days.

For the first aspect, the message received on the first apparatus from the second apparatus can contain at least one parameter, for example, that limits the time for the authorization. For the second aspect, the information compiled on the server for the second apparatus can contain at least one parameter, for example, that limits the time for the authorization. Necessary conditions for establishing an authorization may then be that a check on the authorization by the first apparatus reveals that the time information from a clock of the first apparatus is in a period defined by the at least one parameter.

If, according to the first aspect, the first apparatus establishes that the action is an action that is to be performed or is to be caused by the first apparatus, then the first apparatus can subsequently perform or cause the action. By way of example, the action can be caused by sending a control signal to an actuator, for example to a locking device, for example in order to unlock and/or open a door to one or more spaces (e.g. receiving spaces in a receiving apparatus) in order to allow access to the one or more spaces. Access can be granted to different extents, for example when there are multiple receiving spaces, it is possible for access to be granted just to particular receiving spaces or groups of receiving spaces. By way of example, the extent of the access may be defined by an access authorization parameter in the obtained message. In one exemplary embodiment of the invention, the first apparatus controls access to a container, particularly a parcel box having a compartment or multiple compartments or a combined parcel and letterbox. By way of example, it is possible for the locking and/or unlocking of at least one door to at least one compartment of the container to be controlled.

According to the first aspect, the control unit can cause the action that is to be caused by the control device, for example when the request is obtained from the first apparatus. The first apparatus may be registered with the control device on a general basis, for example, as authorized to request the causing of actions. Since the authorization for requesting has already been checked by the first apparatus, a further check via the control device is then not necessary.

The information compiled by the server according to the second aspect can be transmitted to a second apparatus directly or indirectly, that is to say via at least one further apparatus, for example. The compiled information can be communicated to the second apparatus, for example, by transmitting it, for example via a network, to a computer that then transmits the information by wire (e.g. via a docking station) or wirelessly to a delivery agent device, particularly a hand-held scanner, (as an example of a second apparatus), or by storing it on a tag, particularly an NFC tag (as an example of a second apparatus), or by transmitting it via a secure connection, for example, to a piece of software ("App") on a user device, particularly a mobile telephone, (as an example of a second apparatus) and storing it thereon.

The invention is used in a system for delivering and/or picking up shipments, for example.

The features of all the embodiments described can be used on their own or in any combination for each category of the invention (method, apparatus/system, computer program) and for each aspect of the invention.

Further advantageous exemplary refinements of the invention can be found in the detailed description that follows for a few exemplary embodiments of the present invention, particularly in conjunction with the figures. The figures accompanying the application are intended to be used only for the purpose of clarification, however, rather than for determining the scope of protection of the invention. The accompanying drawings are not necessarily to scale and are intended merely to reflect the general concept of the present invention by way of example. In particular, features included in the figures are in no way intended to be regarded as a necessary part of the present invention.

DETAILED DESCRIPTION OF SOME EXEMPLARY EMBODIMENTS OF THE INVENTION

Figure 1:
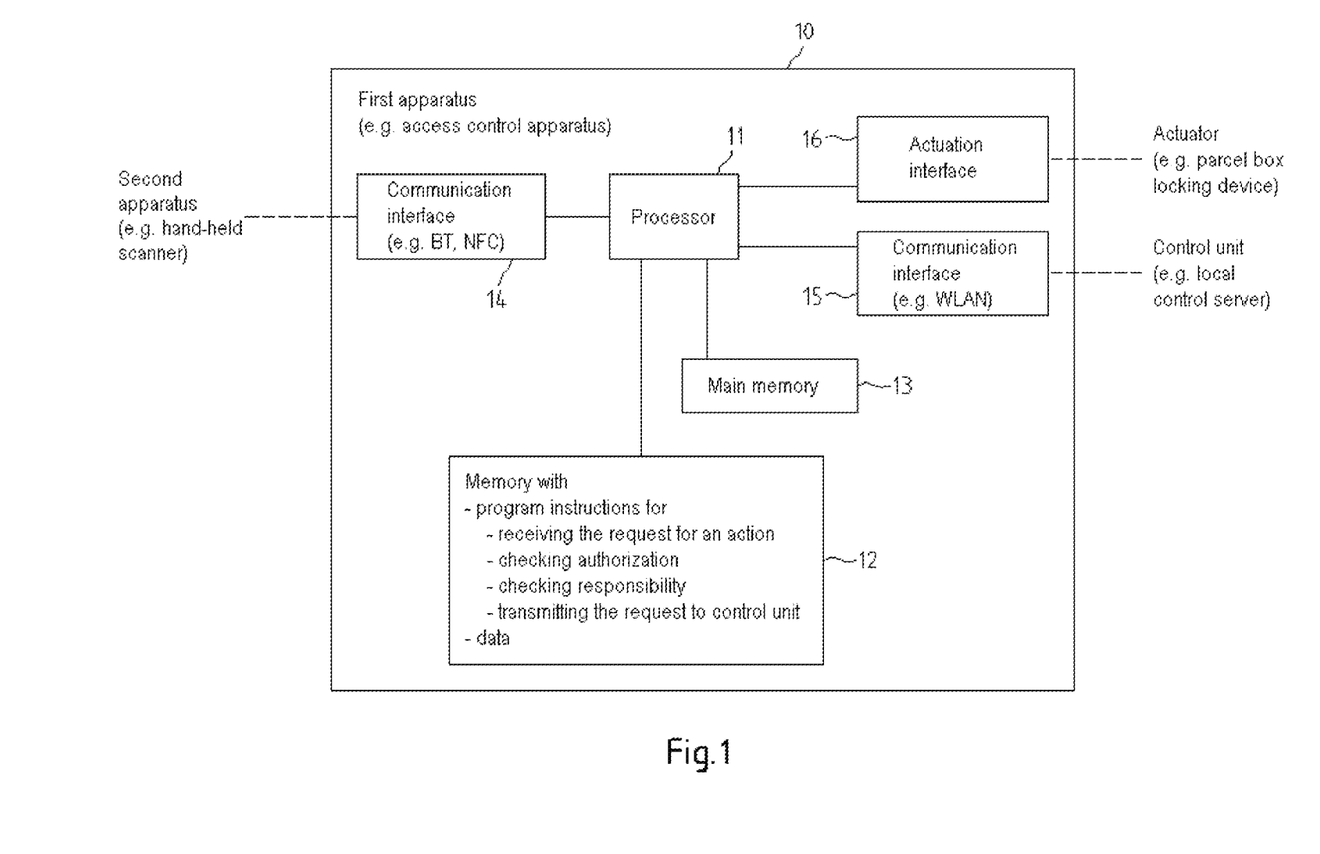
FIG. 1 shows a schematic illustration of an exemplary embodiment of an apparatus according to the first aspect of the present invention.

FIG. 1 is a schematic illustration of an exemplary embodiment of an apparatus 10 according to the first aspect of the present invention.

The apparatus 10 is referred to as first apparatus. By way of example, it may be an access control apparatus that checks the authorization for a request for actions by a second apparatus that are able to be caused by the first apparatus 10 and/or by another control unit.

By way of example, the first apparatus 10 comprises a processor 11 and, connected to the processor 11, a first memory as a program and data memory 12, a second memory as a main memory 13, a first communication interface 14, a second communication interface 15 and an actuation interface 16. It goes without saying that for the same and/or additional tasks, instead of a processor 11, there may also be multiple processors provided, instead of a respective memory 12, 13, there may also be multiple memories provided, and instead of an actuation interface 16, there may also be multiple actuation interfaces provided.

By way of example, the processor 11 may be a microprocessor that also comprises a clock.

By way of example, the memory 12 may be a read only memory (ROM), which only permits read access. This allows the apparatus 10 to be protected against manipulations. The memory 12 stores program instructions from at least one computer program. The computer program may be an exemplary computer program according to the first aspect of the invention, and memory 12 may be an exemplary storage medium according to the first aspect of the invention. The program instructions can comprise program instructions for checking an authorization of a second apparatus to request actions, program instructions for checking whether the requested actions can be caused by the first apparatus 10 itself or by another control unit, program instructions for causing actions by means of actuators and program instructions for transmitting an authorized request for an action to the control unit. An apparatus—e.g. the apparatus 10 or an apparatus containing the apparatus 10—is caused to perform appropriate actions when the processor 11 executes the program instructions. Besides program instructions, the program memory can also store values for different parameters, such as an MAC address associated with the apparatus 10 and/or another identifier (e.g. lock identifier LockID) for the apparatus 10 or a key S2 for decrypting obtained messages or for verifying digital signatures. Such parameter values may alternatively also be stored in an additional nonvolatile random access memory (RAM), however, which is not shown. This could then additionally be used to store variable parameters that are not yet known when the apparatus 10 is manufactured, such as a password for a WLAN. As a further alternative, however, memory 12 itself can also be in the form of a nonvolatile random access memory. This allows or facilitates updates for the program instructions, for example.

The main memory 13 may be a volatile random access memory (RAM), for example. This can be used to store obtained data, currently used program instructions and interim results, for example, while they are required.

The first communication interface 14 may be an interface for Bluetooth (BT) or NFC based communication, for example. It is provided for communication with a second apparatus. The second apparatus may be any portable electronic apparatus, for example a hand-held scanner of a delivery agent or a mobile telephone of a user. It goes without saying that the first apparatus 10 can use this interface 14 to communicate with various second apparatuses.

The second communication interface 15 may be an interface for WLAN based communication, for example. It is provided for communication with a control unit. The control unit may be a local control server for actuating different local actuators, for example.

By way of example, the actuation interface 16 may be an interface to at least one actuator that is controlled by the first apparatus 10. By way of example, such an actuator may be an electronically controllable locking device, for example for a door to a parcel box. If the parcel box comprises multiple compartments, then the same actuation interface 16 or multiple actuation interfaces can be used to actuate a respective electronically controllable locking device for each door of each of the compartments.

The first apparatus 10 may also contain further components. By way of example, the first apparatus 10 could be a locking system, which also contains an electronically controllable locking device, inter alia, or a safekeeping apparatus, such as a parcel box, which comprises such a locking system and a space secured thereby. Alternatively, the first apparatus 10 could also contain fewer components, for example only the processor 11 and the memories 12 and 13. By way of example, it could be a module for an access control apparatus that additionally contains the interfaces 14, 15 and 16.

FIG. 1 can also be understood to be an illustration of a system according to the first aspect that comprises the first apparatus 10 and furthermore the second apparatus and/or the control unit.

Figure 2:
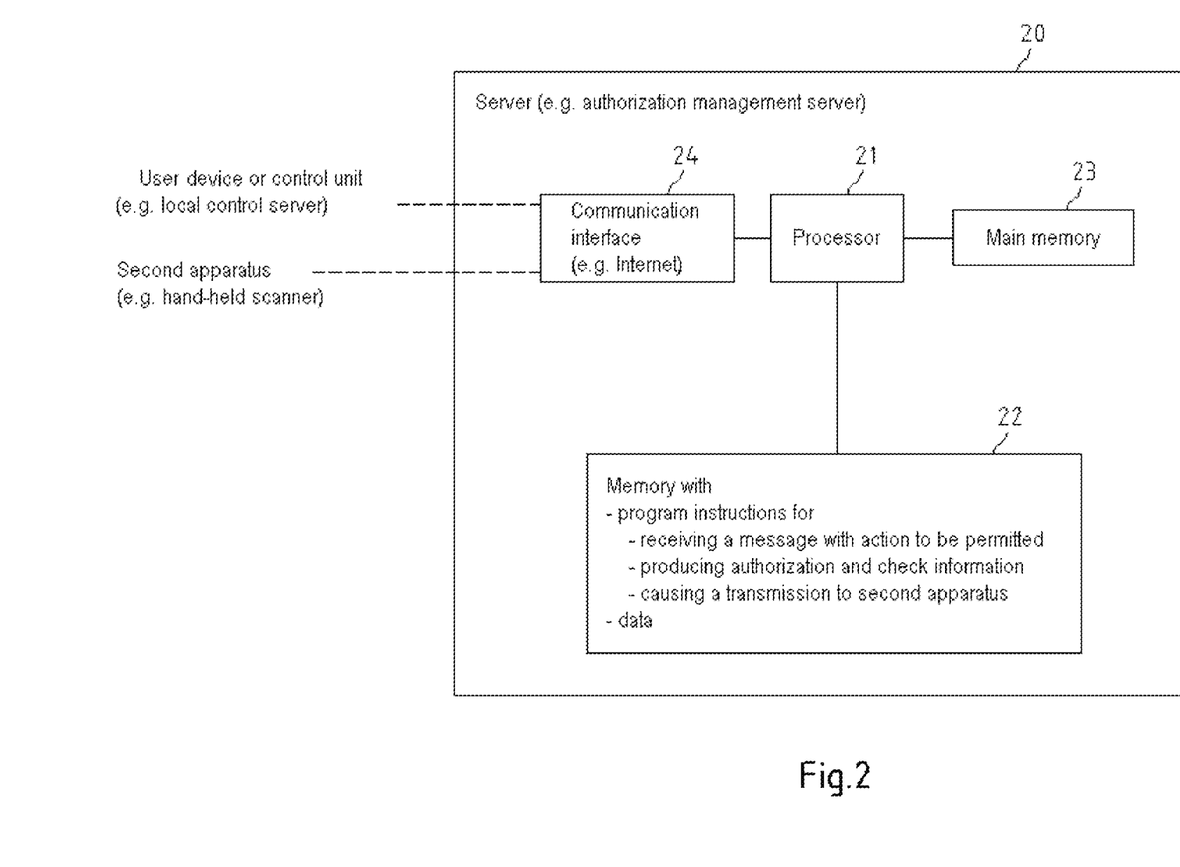
FIG. 2 shows a schematic illustration of an exemplary embodiment of an apparatus according to the second aspect of the present invention.

FIG. 2 is a schematic illustration of an exemplary embodiment of an apparatus 20 according to the second aspect of the present invention.

By way of example, the apparatus 20 may be an authorization management server that provides a second apparatus with an authorization to use a first apparatus 10 to request the causing of an action by a control unit.

By way of example, the apparatus 20 comprises a processor 21 and, connected to the processor 21, a first memory 22 as a data and program memory, a second memory 23 as a main memory and a communication interface 24. It goes without saying that for the same and/or additional tasks, instead of a processor 21, there may also be multiple processors provided, and instead of a respective memory 22, 23, there may also be multiple memories provided.

The processor 21 may be a digital signal processor, for example.

By way of example, the memory 22 may be a nonvolatile random access memory. The program memory stores program instructions from at least one computer program. The computer program may be an exemplary computer program according to the second aspect of the invention, and memory 22 may be an exemplary storage medium according to the second aspect of the invention. The program instructions can comprise program instructions for obtaining a message. The message can state that an authorization for requesting an action that can be caused by a control unit needs to be allocated, the action being able to be requested from the control unit via a first apparatus. They may further comprise program instructions for compiling information that identifies the action and that allows the first apparatus to check the authorization. The compiled information is based at least in part on the obtained message and can be regarded as a digital key. The program instructions can further comprise program instructions for causing transmission of the key to a suitable second apparatus so that the latter can request the action via the first apparatus. A server—e.g. the apparatus 20 or a server containing the apparatus 20—is caused to perform appropriate actions when the processor 21 executes the program instructions from memory 22. Besides program instructions, the memory 22 may also store different data. Such data can comprise an association between different parameter values and different first apparatuses 10, for example. It would thus be possible for a respective identifier (e.g. lock identifier LockID) of a first apparatus 10, for example, to have an associated key S1 for encrypting or signing messages for the first apparatus 10, an associated MAC address for the first apparatus 10 and/or an associated street address for the first apparatus 10. Such data may alternatively also be stored in an additional nonvolatile random access memory, however, which is not shown.

By way of example, the main memory 23 may again be a volatile random access memory that can be used to store obtained data, currently used program instructions and interim results while they are needed.

By way of example, the communication interface 24 may be a TCP/IP interface that allows direct or indirect communication with various other devices via the Internet, for example with portable electronic devices and other servers.

The apparatus 20 can contain any further components, such as a user interface for servicing tasks, for example. Alternatively, the apparatus 20 could also contain fewer components, for example only the processor 21 and the memories 22 and 23. By way of example, it could be a module for a server that additionally contains the interface 24.

FIG. 2 can also be understood to be an illustration of a system according to the second aspect that comprises the apparatus 20 and furthermore the second apparatus and/or the control unit.

Figure 3:
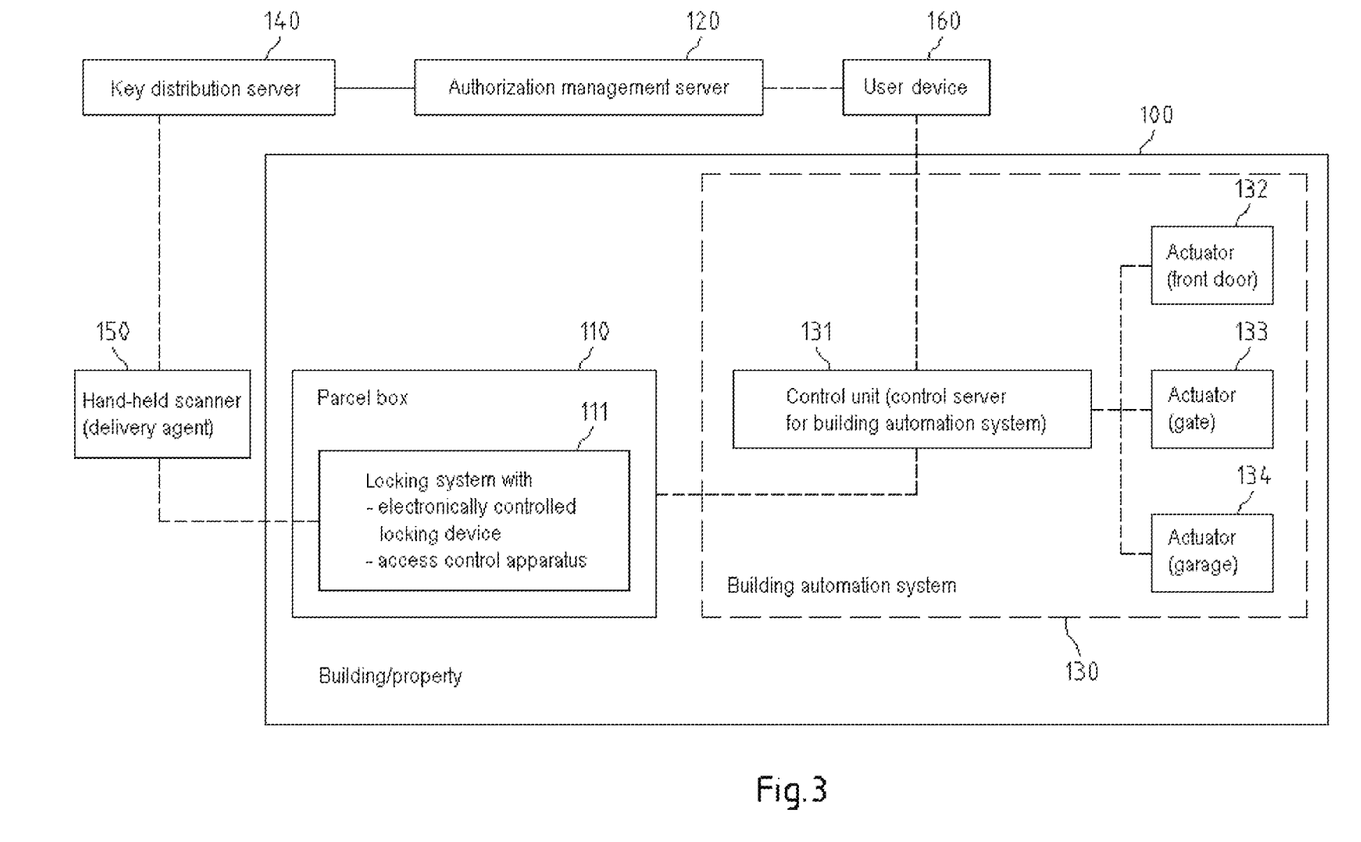
FIG. 3 shows a schematic illustration of an exemplary embodiment of a system according to the present invention.

FIG. 3 is a schematic illustration of an exemplary embodiment of a system according to the invention. In this case, the system may be or contain a system according to the first aspect, and similarly be or contain a system according to the second aspect.

The system comprises fixed-location components 110, 130 that are associated with a particular building or property 100, fixed-location servers 120, 140 in a logistics company and portable electronic devices 150, 160.

The fixed-location components that are associated with a particular building or property 100 include a parcel box 110 and components of a building automation system 130.

The parcel box 110 comprises at least one locking system 111 having a digital locking device and an access control apparatus. The digital locking device can secure a door of the parcel box 110. By way of example, the access control apparatus may correspond to the first apparatus 10 from FIG. 1. The access control apparatus, the locking system or the entire parcel box is an exemplary first apparatus according to the first aspect of the invention. By way of example, the parcel box 110 is a parcel box for a single-family house that comprises a single compartment with an associated locking system. Alternatively, however, it could also be a parcel box for an apartment building and comprise a plurality of compartments secured by a respective locking device. In the latter case, all locking devices are part of the same locking system and are controlled by the same access control apparatus; otherwise, a separate access control apparatus can be used for each locking device, so that each compartment has a separate locking system. Each locking device is identified by a univocal identifier (LockID). The parcel box 110 may additionally comprise at least one letterbox.

The building automation system 130 comprises a control server 131 as control unit and multiple actuators 132-134 that can be actuated by the control server 131.

By way of example, the control server 131 comprises a processor, a program and data memory, a main memory and at least one communication interface. The program and data memory comprises program instructions for receiving requests to cause particular actions and program instructions for causing the actions, for example by virtue of actuation of the relevant actuators. The requests can be made by arbitrary devices registered with the control server, provided that the registration is caused by a person who is authorized to do so. By way of example, the program and data memory may contain registration information in this regard, and also, by way of example, at least one password and at least one key for secure communication. By way of example, the control server 131 may support a first proprietary communication protocol for communication with the actuators 132-134 and a second proprietary communication protocol for communication with registered devices.

By way of example, the actuators may comprise locking devices for various doors and gates, such as for a front door 132, for a gate that restricts access to the grounds 133, for an apartment door, for a cellar door, for a garage door 134, etc. The actuators may also comprise various other actuators, such as electronic switches for lights, thermostats, etc.

By way of example, the actuators 132-134 may be configured to be able to use at least one wireless access point in a dedicated building WLAN or to use another radio link for communication. The control server 131 may likewise be configured to use a wireless access point or to use another radio link for communication. A wireless access point or a router connected thereto allows a connection to a permanently installed communication network, including a connection to the Internet, by means of cables. The control server 131 may alternatively also be connected by means of cables to the wireless access point and/or to the Internet, for example. The control server 131 could further be connected to at least some of the actuators 132-134 also by cable, for example by means of a dedicated building LAN.

By way of example, the fixed-location servers in a logistics company include an authorization management server 120 and a key distribution server 140. The authorization management server 120 can correspond to the apparatus 20 from FIG. 2. The key distribution server 140 is configured to communicate—directly or indirectly—with the authorization management server 120 and with different delivery agent devices. It goes without saying that the functions of the authorization management server 120 could also be implemented in the key distribution server 140. On the other hand, an authorization management server 120 could also have a plurality of associated key distribution servers 140. In that case, the key distribution servers 140 could optionally also be associated with different service providers.

It goes without saying that there may furthermore be various further servers of the logistics company incorporated in the system according to the invention.

The portable electronic devices of the system can include firstly delivery agent devices, such as hand-held scanners 150 used by parcel delivery agents, and secondly at least one user device 160.

By way of example, the hand-held scanners 150 comprise a scanner for scanning shipmentIDs or other codes on parcels or other mail shipments, at least one memory for storing current digital keys for various parcel boxes and for storing program instructions for causing the hand-held scanner 150 to perform different actions.

The user device 160 may be any device that is configured for data communication, such as, by way of example, a smartphone, a tablet PC or a desktop PC that is used by a person registered to use the building automation system 130. The user device 160 may have an application stored on it that allows the use and possibly configuration of the building automation system 130. The user device 160 may be configured to use at least one wireless access point or to use another radio link for communication. By way of example, there could be provision for communication with the control server 131 via a WLAN and for communication with the authorization management server 120 via the WLAN or a mobile radio network and, further, via the Internet.

Figure 4:
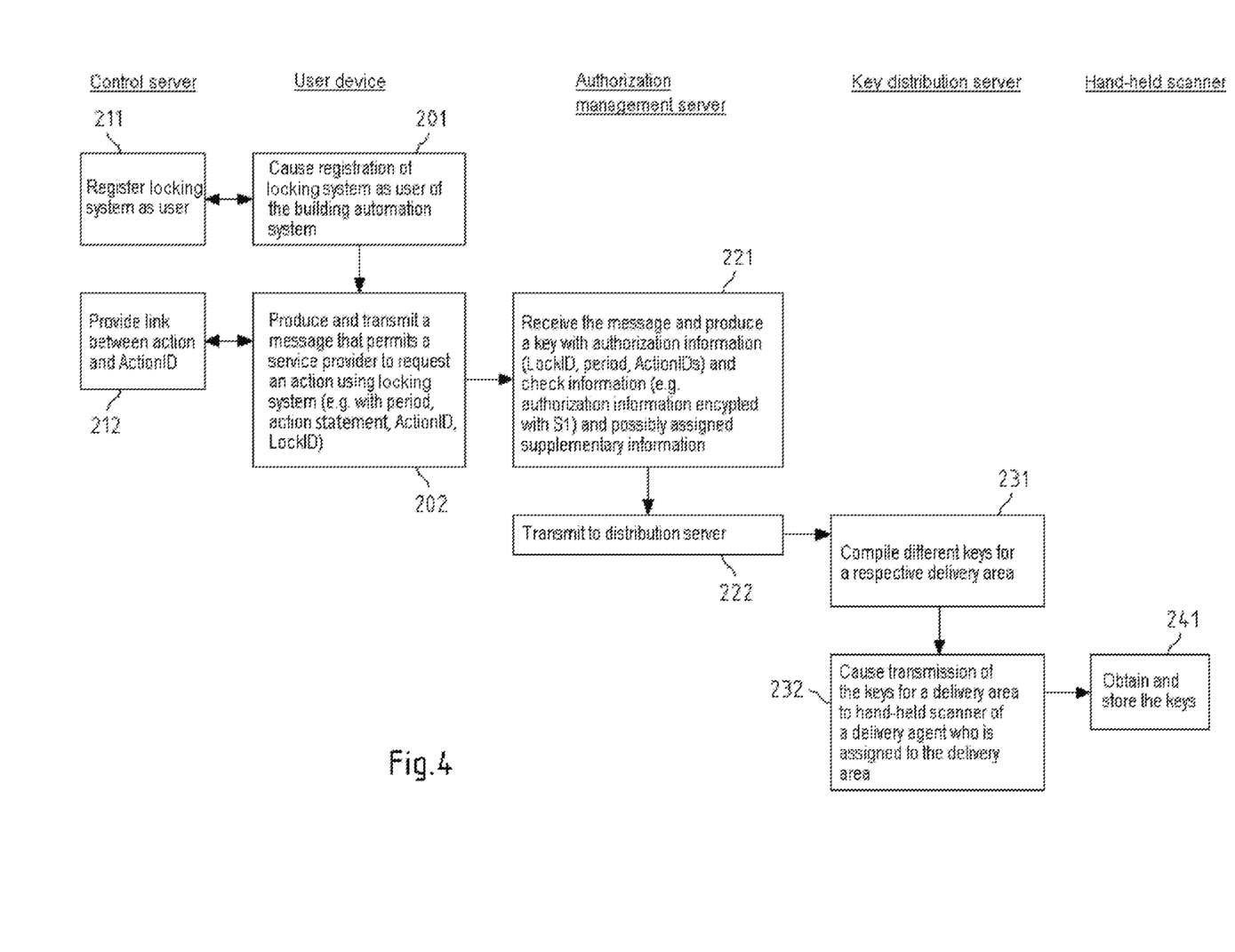
FIG. 4 shows a flowchart with exemplary operations in the system from FIG. 3 according to the second aspect of the present invention; and, FIG. 5 shows a flowchart with exemplary operations in the system from FIG. 3 according to the first aspect of the present invention.
Figure 5:
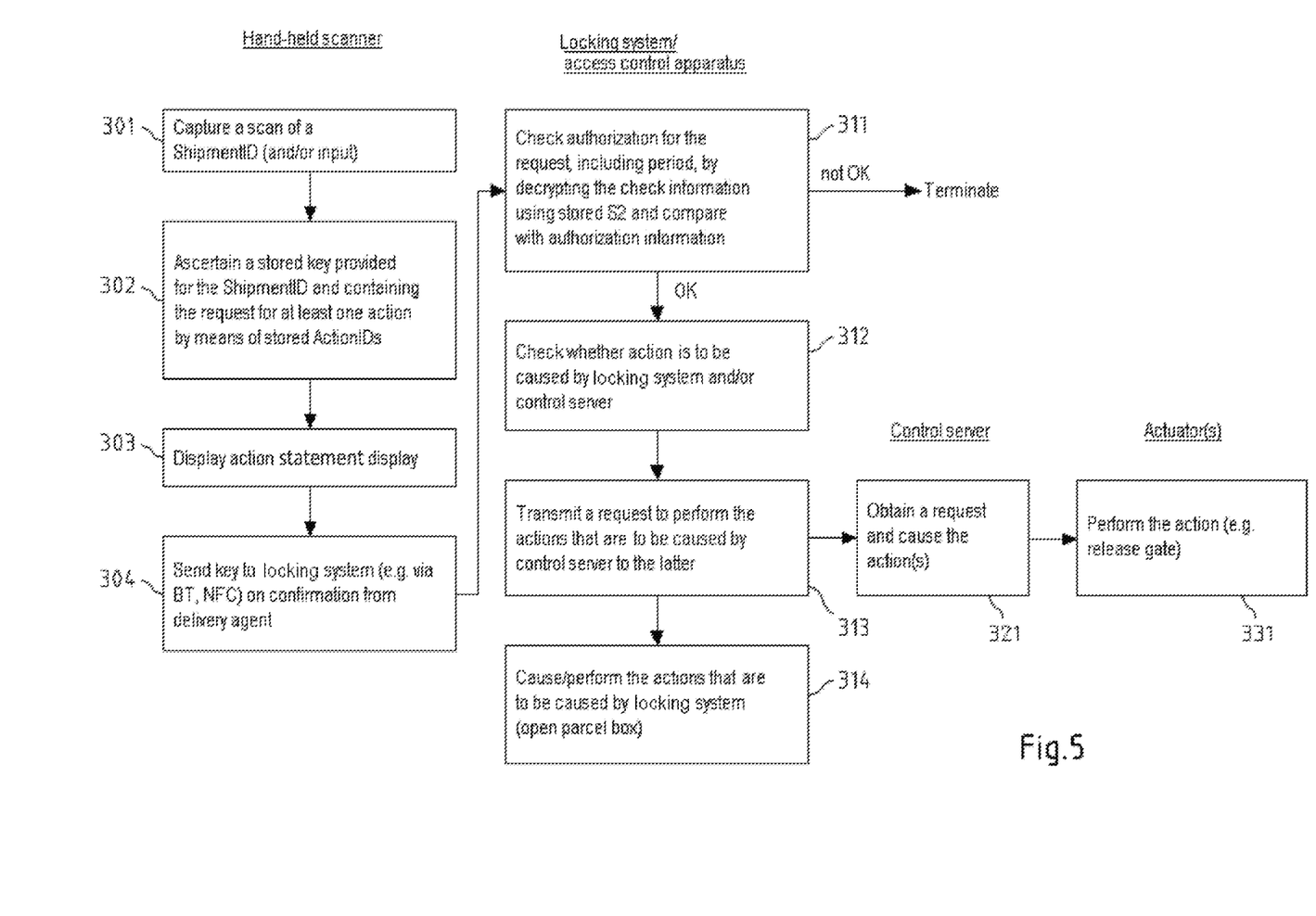

By way of example, the system allows a parcel delivery agent to cause, for a limited time, the actuation of actuators 132-134 enabled specifically for this purpose that are controlled by the building automation system 130, without the delivery agent having to become registered with the building automation system 130 for this purpose. FIGS. 4 and 5 illustrate exemplary operations in the system from FIG. 3.

FIG. 4 is a flowchart that illustrates actions for provision of a digital key for a hand-held scanner 150 of a delivery agent.

The parcel box 110 allows a delivery agent to deliver or pick up a parcel even when the recipient is not at home. To this end, a hand-held scanner 150 of the delivery agent obtains and stores a digital key specifically for the parcel box 110 of the recipient. The digital key allows the delivery agent to open the parcel box 110. In this case, the validity of the digital key may be limited to the day of the delivery, for example. In some cases, however, delivery or pickup may not readily be possible despite an available valid key for the parcel box 110. By way of example, the parcel may be too large for the parcel box 110, or although the parcel box 110 is in the open air, it is installed on demarcated grounds behind a locked gate.

If, in such a case, the recipient is provided with a notification that a parcel is to be delivered on the next day (or if he has ordered pickup of a parcel for a particular day), then he can additionally allow the delivery agent restricted use of a building automation system 130 for a limited time. For this purpose, the user can use an arbitrary user device 160 and an appropriate configuration application for the building automation system 130 to configure the control server 131 such that the locking system 111 of the parcel box 110 is registered as a further authorized user of the building automation system 130. Such a setting can be made one time, for example. (Steps 201, 211)

Additionally, the user can use the configuration application or a separate authorization application to select at least one action that is to be allowed and also an associated period. The user device 160 transmits to the authorization management server 120 a message that contains an identification for the locking devices of the locking system 111, e.g. in the form of the LockID or an MAC address, a statement for the action and an ActionID that identifies the action in the control server 131, and also a statement for the selected period. The identification of the locking device may be stored in the user device 160, for example, and retrieved for the message. Alternatively, the authorization management server 120 could store identifications for the locking devices with an association with respective user data and select the required identification automatically on the basis of transmitted user data. Such user data—for example including a password—could be transmitted before or together with the message anyway in order to provide the necessary security against manipulations. If a user has multiple associated locking devices, then the authorization management server 120 can then use the user device 160 to provide the user with a list for selection. The association between action and ActionID can be retrieved from the control server 131 by means of the user device 160, for example. Optionally, provision could also be made for a particular, heralded shipment to be additionally identified in the message, for example in accordance with a ShipmentID that the notification contains. In particular, the authorization management server 120 may be configured exclusively for one particular service provider, for example the logistics company. If the authorization management server 120 is provided for multiple service providers, then an identification for the service provider can additionally be transmitted. In this case, the transmission can take place via the Internet, which is accessed via WLAN or via a mobile radio network as appropriate. (Steps 202, 212)

If the user device 160 uses separate applications for interaction with the control server 131, on the one hand, and the authorization management server 120, on the other hand, then these applications could if need be also interact with one another in order to assist the user in the compilation of the data that are to be transmitted. For interaction with the authorization management server 120, the user could, however, also use the user device 160, for example, to log into the authorization management server 120 via a browser and transmit the message by means of an application running only in the browser.

Alternatively, the message could also be compiled by the control server 131 and transmitted to the authorization management server 120.

The authorization management server 120 can be caused to perform the subsequent steps 221 and 222 by a processor of the authorization management server 120 (e.g. corresponding to processor 21) on execution of program instructions from a memory of the authorization management server 120 (e.g. corresponding to memory 22).

The authorization management server 120 receives the message from the user device 160 and then generates a digital key. (Step 221) The digital key contains a piece of authorization information and a piece of check information and, if need be, is augmented by accompanying supplementary information.

By way of example, the authorization information can contain the LockID, the ActionID and various parameters that define the specified period. Additionally, the authorization management server 120 can add statements pertaining to an action that is generally associated with the LockID—particularly opening a parcel box compartment. Such statements can be stored in a memory (e.g. corresponding to memory 22) of the authorization management server 120 and read using the obtained LockID. It goes without saying that the authorization information can also have any further information added, such as a number of permitted access operations for actions by means of the generated digital key.

By way of example, the authorization information may contain one or more of the following authorization parameters:

LockID: ID of the locking device
NotBeforeDate: "valid from" date with year/month/day
NotAfterDate: "valid to" date with year/month/day
StartTimeOfDay: time of day from when the access authorization is valid (standard e.g. 00:00:00)
EndTimeOfDay: time of day until when the access authorization is valid (standard e.g. 23:59:59)
MaxUses: number of uses; standard 0 means "unlimited"
Permissions: consent for security-critical operations on the locking system
External Permission: ActionID for building automation system In this case, the two parameters "NotBeforeDate" and "NotAfterDate" define the validity period for the access authorization, e.g. with the precision of one day. "NotBeforeDate" stipulates the date of first use and "NotAfterDate" stipulates the last day in the validity period. "StartTimeOfDay" further specifies the time of day from when the validity period begins, and "EndTimeOfDay" specifies when it ends. The precision is one second, for example. "MaxUses"

defines how often the digital key can be used in order to open a lock of a locking device. In this case, the value "0" stipulates that the digital key can be used without limitation in the defined period, for example. "Permissions" encodes, for example by setting individual bits in a byte, what security-critical operations an device that has the digital key is permitted to perform (a bit set to '1' then indicates the existence of authorization in each case), e.g. whether opening a parcel compartment or whether opening a parcel compartment and a letter compartment is permitted each time. "External Permission" defines a first ActionID for an action, as is expected by the control server 131 of the building automation system 130 for requesting an action. When all bits are set to '0', this can indicate that no action has been enabled, for example. If it is known to be possible to request multiple actions controlled by means of a building automation system 130, then multiple parameters can be provided for this purpose, for example "External Permission 1" and "External Permission 2", etc. In this case, a fixed number of such parameters may be provided that can be set to zero if need be, or provision can be made for such parameters to be able to be added as required.

The check information allows the authorization information and hence the authorization per se to be checked. By way of example, it may be a piece of authorization information encrypted using a key S1 stored on the authorization management server 120, or a signature for the authorization information, which signature is generated using a key S1 stored on the authorization management server 120. By way of example, the key S1 may be a key from a symmetric key pair or a key from an asymmetric key pair. A memory (e.g. corresponding to memory 22) of the authorization management server 120 may store, for a multiplicity of locking systems, a respective dedicated key S1 with an association with the LockID of the respective locking system. The respectively required key S1 can then be retrieved using the obtained LockID and can be used for generating the check information. In the case of a symmetric key pair, the key S1 may be stored exclusively in the authorization management server 120 and—as an identical key S2—in the locking system 111 identified by the LockID. In the case of an encryption method using an asymmetric key pair, the public key S1 for encryption may be stored exclusively in the authorization management server 120, while the corresponding private key S2 for decryption may be stored exclusively in the locking system 111 identified by the LockID. In the case of a signing method using an asymmetric key pair, the private key S1 for signing may be stored exclusively in the authorization management server 120, while the corresponding public key S2 for checking the signature may be stored exclusively in the locking system 111 identified by the LockID.

The statement of the actions that are identified in the digital key by means of the ActionIDs can be appended to the digital key, for example as supplementary information in text form. It goes without saying that it is also possible for arbitrary further information to be appended as supplementary information, such as a ShipmentID for an expected parcel, a ShipmentID for a parcel to be picked up, a street address associated with the LockID of the locking system 111 in a memory (e.g. corresponding to memory 22) of the authorization management server 120 and/or the obtained MAC address of the locking system 111, or the MAC address read from a memory (e.g. corresponding to memory 22) of the authorization management server 120.

The authorization management server 120 transmits the prepared digital key with the assigned supplementary information to the key distribution server 140. (Step 222)

The authorization management server 120 can generate appropriate digital keys for a multiplicity of users when a parcel needs to be delivered or picked up for the respective user. If the recipient of a parcel to be delivered or a sender of a parcel to be picked up has enabled no additional actions from a building automation system 130 by a stipulated time, the authorization information in this case merely comprises an adapted parameter for enabling a parcel box 110 to be opened, for example. In that case, the period of validity for the digital key can be stipulated as a predetermined longer period on the day scheduled for the delivery (for example for the whole day, that is to say between 0:00 hours and 23:59 hours), for example.

The key distribution server 140 obtains from the authorization management server 120 a multiplicity of digital keys, for example via a secure Internet connection. The key distribution server 140 stipulates delivery areas, in which delivery agents are to deliver parcels, for a respective day. It then compiles the digital keys for each delivery area, which contain a LockID that identifies a locking system in the delivery area. To this end, the key distribution server 140 can store an association between the LockIDs of the locking systems of installed parcel boxes and street addresses in a memory and evaluate it for compiling the digital keys, provided that the street addresses have not already been provided by the authorization management server 120 together with the digital keys. (Step 231)

The key distribution server 140 then causes transmission of the digital keys compiled for a respective delivery area together with the supplementary information for the digital keys that has possibly been assigned by the authorization management server 120 to the hand-held scanner 150 of a delivery agent who is assigned to the delivery area. (Step 232) The transmission can take place in diverse ways. By way of example, the transmission can take place in a parcel center at which the delivery agent loads the parcels to be delivered. In that case, the transmission can take place via a local WLAN, for example.

Alternatively, a transmission could take place using a fixed-location computer by means of cable connection or Bluetooth, or else via a docking station for the hand-held scanners. As a further alternative, the transmission could also take place via a mobile radio network if the hand-held scanners are configured for communication via the mobile radio network. In each case, the transmission may be additionally secured, for example by means of encryption that can be decrypted only by the respectively provided hand-held scanner 150.

The hand-held scanner 150 obtains the digital keys for a delivery area and stores them in an internal memory. (Step 241) Since each key has a validity lasting no more than one day, for example, the stored digital keys can automatically be erased before new digital keys are read in or at a particular time of day in each case.

It goes without saying that a digital key can, in certain situations, also be transmitted to more than one hand-held scanner 150, for example in order to allow more flexible handling in adjoining delivery areas.

FIG. 5 is a flowchart that illustrates the causing of actions by a building automation system 130 by means of a hand-held scanner 150 using a suitable digital key.

A delivery agent delivers parcels in an assigned delivery area and does so using the hand-held scanner 150. The hand-held scanner 150 stores the digital keys for the delivery area that have been generated for the current day.

A parcel needs to be delivered at a particular address. The recipient has a parcel box at the address, but it is located behind a locked gate. The delivery agent scans a ShipmentID or a more extensive code on the packet using the hand-held scanner 150. The ShipmentID is captured by the hand-held scanner 150 and made available to an application running on the hand-held scanner 150. (Step 301) The application uses the ShipmentID to ascertain an associated, stored digital key and stored supplementary information associated with the digital key. (Step 302) The supplementary information is displayed at least in part on a display of the hand-held scanner 150. By way of example, the displayed supplementary information contains the statement that there is authorization for a gate and the parcel box to be opened. (Step 302) By way of example, the digital key contains, in the authorization information, an appropriately set bit in the "Permissions" parameter for opening the parcel box and an "External Permission" parameter with the building-automation-system-specific ActionID for opening the gate.

The delivery agent can thus request that the gate and the parcel box 110 be opened by inputting a confirmation on the hand-held scanner 150.

The hand-held scanner 150 then sets up a connection to the access control apparatus of the locking system 111 of the parcel box 110, for example a Bluetooth connection. To this end, the hand-held scanner 150 can use an MAC address for the locking system 111 that the read digital key or the supplementary information contains in order to allow or speed up connection setup. In some exemplary embodiments, the LockID could also be identical to the MAC address, so that separate inclusion of an MAC address in the digital key or in the supplementary information is not required. Connection setup is alternatively possible without knowledge of the MAC address by means of a Bluetooth pairing. When the connection has been set up, the hand-held scanner 150 transmits the ascertained key to the access control apparatus of the locking system 111. The supplementary information does not need to be transmitted in this case, since it may be required only for the operation of the hand-held scanner 150 and for a piece of information to the delivery agent. (Step 304) As an alternative to a Bluetooth connection, it is also possible to use a different type of connection, such as an NFC or RFID connection.

The locking system 111 can be caused to perform the subsequent steps 311 to 314 by a processor of the access control apparatus (e.g. corresponding to processor 11) on execution of program instructions from a memory of the access control apparatus (e.g. corresponding to memory 12).

The locking system 111 assists connection setup and receives the digital key via a Bluetooth interface (e.g. corresponding to the communication interface 14).

Obtaining a digital key generally implies a request. The locking system 111 first of all checks the authorization for the request. The check can comprise various points that can be processed in any order. (Step 311)

Thus, the locking system 111 can check whether a LockID that the authorization information contains matches the LockID of the locking device 111. The LockID of the locking device 111 may be stored in a memory of the access control apparatus (e.g. corresponding to memory 12). If there is no match, then the process is terminated.

Furthermore, the locking system 111 can check whether the time indicated by an internal clock falls within a period defined by the authorization information. If this is not the case, then the process is terminated.

Additionally, the locking system 111 could use an internal counter to check whether the same digital key has already been transmitted more often than is permitted according to a statement in a "MaxUses" parameter. If this is the case, then the process is terminated.

Furthermore, the locking system 111 can check the authenticity and integrity of the authorization information. Thus, the locking system 111 can decrypt a piece of check information encrypted using key S1 in the digital key using a key S2 stored in a memory of the access control apparatus (e.g. corresponding to memory 12). The decrypted check information can then be compared with the authorization information. If the pieces of information do not match, then the process is terminated. Alternatively, the locking system 111 can check a signature generated using key S1 as check information in the digital key using a key S2 stored in a memory of the access control apparatus (e.g. corresponding to memory 12). If the signature cannot be validated, then the process is terminated. It goes without saying that both encryption and signature can additionally involve the use of a hash function, which can be taken into account for the check.

If the result of all of the checks was positive, on the other hand, then the locking system 111 checks whether actions identified in the authorization information are to be caused by the locking system 111 and/or via the control server 131 of the building automation system 130. (Step 312)

Actions that are to be caused by the locking system 111 result from set bits in a "Permissions" byte, for example.

Actions that are to be caused by the control server 131 result from the presence of at least one "External Permission" parameter (or from the fact that at least one such available parameter does not just contain zeros), for example.

If at least one action is defined that is to be caused by the control server 131, then the locking system 111 transmits the ActionID from each "External Permission" parameter to the control server 131 as a request for an appropriate action via a WLAN interface (e.g. corresponding to the communication interface 15). (Step 313) The access data required for accessing the WLAN may be stored in a memory of the access control apparatus (e.g. corresponding to memory 12). The access data may have been transmitted to the access control apparatus by the user in a suitable manner, for example likewise via the Bluetooth interface (e.g. corresponding to the communication interface 14). The input of access data may be an action that can be permitted by means of a digital key in the user device 160, for example, in which key a bit provided for this purpose in the "Permissions" parameter is set, inter alia. A corresponding digital key for user devices 160 can likewise be generated and transmitted via the authorization management server 120.

Since the locking system 111 is registered with the control server 131 as an authorized user, the obtained request is regarded as permissible, and the control server 131 causes the identified action. (Step 321) By way of example, this can involve a suitable control signal being sent to the actuator 133 responsible for the identified action via WLAN or by wire.

By way of example, the actuator 133 may be an electronically controlled lock, in the present example a lock of the gate. The control signal causes the lock to be released, so that the delivery agent can open the gate for a short time and can enter the demarcated grounds. (Step 331) Alternatively, particularly in the case of a larger entrance gate, a motor could also be actuated that opens the gate automatically.

If at least one action is defined that is to be performed or to be caused by the locking system 111, then the access control apparatus causes the relevant action by transmitting an appropriate control signal to an actuator provided for the action via an actuation interface (e.g. corresponding to the actuation interface 16) that is provided for this purpose. By way of example, it is thus possible for particularly the parcel box 110 to be opened by the locking device 111. (Step 314) The parcel delivery agent can therefore place the parcel into the parcel compartment and then push the door of the parcel box 110 to again.

The locking system 111 of the parcel box 110 may be configured such that before the door of the parcel box 110 is released, transmission of a digital key must involve a button being pushed or a proximity sensor having detected a nearby object. After entering the fenced-off grounds, the delivery agent may thus need to transmit the digital key again so that the door of the parcel box opens. The delivery agent can transmit the key a third time if need be, in order to be able to leave the grounds again by the gate if the gate is also released from the inside by means of the control server 131 or a physical key only. The opportunity to transmit the digital key can therefore be displayed to the delivery agent on the display until the display is actively closed by the delivery agent after he has left the grounds again. Additionally or alternatively, it is possible to call up a repetition of the last display in order to allow the delivery agent to transmit the digital key again.

Certain embodiments of the invention therefore allow extension of the usability of delivery agent devices that can communicate with an access control device of a parcel box in order to request that said access control device cause actions. Certain embodiments of the invention furthermore allow extended usability of actions controlled by means of a building automation system.

It goes without saying that the system described and the methods described explain the invention merely by way of example. The system can be modified by adding, altering and omitting components, and the methods can be modified by adding, altering and omitting steps. Some steps can also be performed in different orders, and individual steps can also be performed by different components, than described.

Some of the possible diverse variations are listed below by way of example.

In another situation, although a parcel box may be freely accessible, the recipient may expect the parcel to be too large to be placed in the parcel box. In that case, he can cause (rather than authorization to open a fence gate or the like) authorization for opening a garage door so that the parcel can be left in the garage. For a garage door, a building automation system can provide for successive transmission of an appropriate ActionID to cause first the garage door to be opened and then the garage door to be closed. In this case, the delivery agent thus needs to transmit the key a second time after placing the parcel in the garage in order to close the garage door again.

The invention can be used not only for a building automation system but also for a building locking system, for example. A building locking system may be configured for an office building or apartment building, for example, in which apartment or office doors are accessible by means of individually configured chips, and in which all chips allow access to a building entrance and possibly a garage and possible a cellar.

In another situation, the parcel box may be installed behind the front door in the staircase in an apartment building. Instead of a building automation system, a central building locking system could then exist that can open the front door, at least one cellar door and a garage door, for example, electronically under the control of a control server. A locking system of the parcel box may then be registered with the building locking system as an additional user. All residents could have the authorization to allow the front door to be opened by means of a hand-held scanner of a delivery agent when required, in a similar manner to that described above for the building automation system. Alternatively, generally the landlord or an owner collective could have predetermined on the authorization management server that any preparation of a normal digital key for the parcel box additionally involves the insertion of an authorization for the front door to be released by the central locking system into the digital key.

If security-relevant operations by the access control apparatus of a locking system of a parcel box require no more than 4 bits of a "Permissions" byte, for example, then the remainder of the bits could also be used for identifying actions that are to be caused by a control server of a building automation system. In that case, the control server could associate an action with a particular one of bits 5-8 in a byte, which action is then caused when a byte having an appropriately set bit is obtained.

The transmitted data and the transmission of the data between the individual components of the system can be protected against access and/or against unauthorized amendments in any other and/or additional ways.

The approach described can be used not only on the basis of access control apparatuses for parcel boxes but also for other types of access control apparatuses, for example access control apparatuses for parcel butlers or access control apparatuses for totally different access controls. In this case, a parcel butler is a collapsible container that can be installed on a building or apartment door whenever required. As with a parcel box, a delivery agent can place a shipment into the parcel butler and lock it up against theft by means of a locking system.

The approach described can be used to allow not only delivery agents but also various other persons to perform additional actions. By way of example, provision could thus be made for a neighbor to remove parcels left for the user in the parcel box and letters put into a letterbox, and to place them in the house of the user, while a parcel box user is on holiday. The neighbor could optionally have a separate parcel box or already be authorized to use the parcel box jointly and therefore have already installed an appropriate application for receiving and transmitting a digital key for opening a parcel box on a mobile telephone or have an appropriate tag. An additional or alternative digital key could then be generated for the neighbor specifically for the duration of the holiday period, said key allowing the parcel box and the letterbox of the user to be opened by a locking system of a combined parcel and letterbox and the front door of the house of the user to be opened (following an authorization check by the locking system of the combined parcel and letterbox) by a building automation system. This digital key can be produced by a server at the request of the user and then transmitted to a portable electronic device of the neighbor for temporary use.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method, performed by a parcel box, comprising the steps of:
   receiving by the parcel box a message that contains a requested action, the message being provided by a portable electronic device;
   checking an authorization for the message;
   determining whether the requested action received from the portable electronic device is to be performed by the parcel box or by a control unit that is separate from the parcel box; and
   transmitting by the parcel box a request to the control unit to cause the requested action when the step of checking determines the authorization exists and when the step of determining determines that the requested action is to be performed by the control unit; and
   performing the action by the parcel box when the step of checking determines the authorization exists and when the step of determining determines that the requested action is to be performed by the parcel box.

2. The method according to claim 1, wherein the step of checking the authorization for the message comprises the steps of:
   decrypting encrypted data contained in the message to obtain decrypted data;
   comparing the decrypted data with unencrypted data.

3. The method of claim 2, wherein the step of comparing the decrypted data with unencrypted data comprises the step of comparing the decrypted data with unencrypted data contained in the message.

4. The method of claim 2, wherein the step of comparing the decrypted data with unencrypted data comprises the step of comparing the decrypted data with unencrypted data derived from contained data.

5. The method of claim 2, wherein the step of comparing the decrypted data with unencrypted data comprises the step of comparing the decrypted data with unencrypted data stored in the parcel box.

6. The method according to claim 1, wherein the step of transmitting by the parcel box the request to the control unit to cause the requested action comprises the step of:
   transmitting by the parcel box the request to the control unit to cause the control unit to enable access to a secured area.

7. The method according to claim 1, wherein the parcel box
   is fitted at a fixed location, and
   includes a receiving unit, access to which is controlled by a locking system.

8. The method according to claim 1, wherein the parcel box
   comprises a locking mechanism, a processor, a memory and two communication interfaces,
   uses a first, radio-based, communication protocol for receiving the message from the portable electronic device, and
   uses a second, radio-based, communication protocol, different from the first communication protocol, for transmitting the request to the control unit.

9. The method according to claim 1, wherein the portable electronic device
   is a hand-held scanner.

10. The method according to claim 1, wherein the control unit
    is a server of a home automation.

11. The method according to claim 1, wherein the message contains at least one parameter that limits a time for the authorization.

12. The method according to claim 1, wherein the control unit causes the action on obtaining the request from the parcel box.

13. The method of claim 1, wherein the control unit is a control unit of a central locking system of a building.

14. The method of claim 1, wherein the step of checking the authorization for the message comprises the steps of:
    decrypting encrypted data contained in the message to obtain decrypted data; and
    checking a digital signature contained in the message for data contained in the message on the basis of the data contained in the message.

15. The method of claim 1, wherein the portable electronic device is a portable electronic device of a delivery agent.

16. The method of claim 1, wherein the portable electronic device is a mobile communication device.

17. A parcel butler comprising at least one memory having program instructions of a computer program and at least one processor, the computer program configured to perform the following when executed by the at least one processor:
    obtaining a message from a portable electronic device, wherein the message is used to request the causing of an action, checking the authorization for the message on the basis of the message, determining whether the action is to be performed or caused by the parcel butler or an action that is to be caused by a control unit that is separate from the parcel butler, and when the step of checking determines that authorization exists and when the step of determining determines that the action is to be caused by the control unit, transmitting a request to the control unit to cause the action, and when the step of checking determines the authorization exists and when the step of determining determines that the action is to be performed by the parcel butler, performing the action by the parcel butler.

18. The parcel butler according to claim 17, wherein the step of checking of the authorization for the message comprises the following:

decrypting encrypted data contained in the message, and comparing the decrypted data with unencrypted data, wherein the unencrypted data are likewise contained in the message.

19. The parcel butler of claim 18, wherein the step of comparing the decrypted data with unencrypted data comprises the step of comparing the decrypted data with unencrypted data derived from contained data.

20. The parcel butler of claim 18, wherein the step of comparing the decrypted data with unencrypted data comprises the step of comparing the decrypted data with unencrypted data stored in the parcel butler.

21. The parcel butler according to claim 17, wherein the action that is to be caused by the control unit comprises the step of:

enabling access to a secured area, the secured area not being a parcel box receiving area, a letterbox receiving area or a parcel butler receiving area by opening or releasing a door, the door not being a parcel box door, a parcel butler door, or a letterbox door.

22. The parcel butler according to claim 17, wherein the parcel butler is fitted at a fixed location, includes a receiving unit, access to which is controlled by a locking system of the parcel butler.

23. The parcel butler according to claim 17, wherein the parcel butler comprises a locking mechanism, a processor, a memory and two communication interfaces, is configured to use a first communication protocol for receiving the message from the portable electronic device and a second, communication protocol different from the first communication protocol for transmitting the request to the control unit.

24. The parcel butler of claim 23, wherein the first communication protocol for receiving the message from the portable electronic device is a radio-based communication protocol.

25. The parcel butler of claim 23, wherein the second communication protocol for transmitting the request to the control unit is a radio-based communication protocol.

26. The parcel butler according to claim 17, wherein the portable electronic device is a mobile communication device.

27. The parcel butler according to claim 17, wherein the control unit is a server of a central locking system of a building.

28. The parcel butler according to claim 17, wherein the message contains at least one parameter that limits the time for the authorization.

29. The parcel butler of claim 17, wherein the control unit is a control unit of a home automation system.

30. The parcel butler of claim 17, wherein the action that is to be caused by the control unit comprises enabling access to a secured area by opening or releasing a door or a gate.

31. An authorization management server comprising at least one memory having program instructions of a computer program and at least one processor, the computer program configured to cause the authorization management server to perform the following steps when executed by the at least one processor:

obtaining a message seeking authorization for requesting an action to be performed by one of a parcel box or a control unit that is separate from the parcel box, and wherein the control unit is a control unit of a home automation or central locking system, compiling information that identifies the action and that allows the parcel box to check the authorization, the information being based on the obtained message, and transmitting of the compiled information to a handheld scanner in order to authorize the handheld scanner to send a request to the parcel box, wherein the request causes the parcel box to perform the action when the parcel box is authorized to perform the action, and wherein the request causes the parcel box to transmit the request to the control unit to perform the action when the control unit is authorized to perform the action.

* * * * *